Patented May 4, 1926.

1,583,445

UNITED STATES PATENT OFFICE.

NEWELL L. COLLINS, OF IOWA CITY, IOWA.

SEMIDRY ELECTROLYTE FOR STORAGE BATTERIES.

No Drawing. Application filed August 17, 1922. Serial No. 582,556.

*To all whom it may concern:*

Be it known that I, NEWELL L. COLLINS, a citizen of the United States, residing at Iowa City, Iowa, have invented certain new and useful Improvements in Semidry Electrolytes for Storage Batteries, of which the following is a specification.

My present invention relates to electrolytes for storage batteries or accumulators and more particularly to that type of accumulator in which acid electrolytes are used.

Heretofore such accumulators have generally been provided with an electrolyte consisting of dilute sulphuric acid, which being a liquid presented certain disadvantages especially where the accumulators were used on vehicles or were otherwise required to be transported, as the liquid would sometimes splash out of the container.

It has been proposed to make use of semidry or semi-solid solutions of sulphuric acid as an electrolyte and for this purpose attempts have been made to use a mixture of sodium silicate and sulphuric acid as the electrolyte. Such a mixture has at first given good results but it was soon discovered that the life of such an accumulator was very short as compared to the life of a similar accumulator using an aqueous solution of sulphuric acid.

I have found where the electrolyte contains sodium, as where sodium silicate is used, the sodium attacks the metal plates of the accumulator and rapidly causes their disintegration. As is well known, where a liquid electrolyte is used in accumulators, any solid material thrown off by the plates settles to the bottom of the container and causes no damage, unless an accumulation of such material becomes deep enough to short the plates. Where a semi-dry or gelatinous electrolyte is used such falling of material is prevented and the material thrown off is more liable to cause shorting. Gelatinous substances such as these are also subject to shrinkage from loss of moisture causing cracks or fissures in the gel and material dropping from the plates fills these fissures and eventually shorts the plates.

The object of my present invention is to overcome the disintegration of the plates heretofore encountered when semi-solid electrolytes were used.

A further object of my invention is to prevent cracking or checking of the electrolyte and thereby prevent material from separating from the plates.

I have discovered that a semi-dry or gelatinous electrolyte may be made composed of silicic acid and sulphuric acid and as little or no sodium is present to attack the plates, disintegration thereof from that cause is eliminated. As the elimination of disintegration results in reduction of the liability of shorting of the plates, the length of life of the accumulator is materially increased.

Pure silicic acid is difficult to prepare and preserve in liquid form without setting. Where a small percentage of sodium is present, however, setting to a gel is delay. I have found that enough sodium may be present to prevent premature setting without materially injuring the plates of the battery. Experience has shown that the sodium present may be as high as one half percent of the total electrolyte by weight.

The silicic acid solution may be mixed with sulphuric acid and poured into the accumulator where it solidifies to a gel. When this is done it is found advisable to discharge the battery before the electrolyte is placed therein, as the electrolyte may then be prepared with weak sulphuric acid, which is advisable as the presence of strong sulphuric acid causes premature setting of the gel. After the electrolyte is added the accumulator should be fully charged.

As a solution of silicic acid is difficult to prepare and place in a container without premature setting to a gel, I have found that an electrolyte of this type containing little or no sodium may be prepared in situ from an electrolyte composed of sodium silicate and sulphuric acid after the same has been placed in the accumulator and set to a gel, by inverting the entire accumulator in water and removing the sodium sulphate by dialysis. By setting the accumulator upright in sulphuric acid, the sulphuric acid may be replaced by dialysis. By this method a commercially sodium-free gel may be formed in situ.

In order to prevent fissures from forming in the gel, I have found that fibrous inert material may be incorporated in the gel for the purpose of acting as a binder. As glass wool is inert to sulphuric acid and to the material of the plates, I have found this material suitable. When used for this purpose, the glass wool may be placed between the plates of the accumulator before the electrolyte is placed therein.

Having described my invention what I claim is:

1. A semi-solid electrolyte for storage batteries composed of a substantially alkali-metal free silicic acid carrier and an absorbed active chemical.

2. A semi-solid electrolyte for storage batteries composed of a substantially alkali-metal free silicic acid carrier and sulphuric acid.

3. A semi-solid electrolyte for storage batteries composed of substantially sodium-free silicic acid gel and sulphuric acid.

4. In an electrolyte for storage batteries a carrier composed of substantially sodium-free silicic acid gel and sulphuric acid.

5. An electrolyte for storage batteries comprising four parts silicic acid, sodium sulphate less than one part, and sulphuric acid of ordinary battery concentration.

NEWELL L. COLLINS.